United States Patent [19]

Gausman et al.

[11] Patent Number: 4,964,423
[45] Date of Patent: * Oct. 23, 1990

[54] CHECK VALVE

[75] Inventors: Theodore J. Gausman, Mentor; Gary W. Scheffel, Streetsboro, both of Ohio

[73] Assignee: Nupro Company, Willoughby, Ohio

[*] Notice: The portion of the term of this patent subsequent to Aug. 15, 2005 has been disclaimed.

[21] Appl. No.: 392,888

[22] Filed: Aug. 14, 1989

Related U.S. Application Data

[63] Continuation-in-part of Ser. No. 239,557, Sep. 1, 1988, Pat. No. 4,856,555.

[51] Int. Cl.$^5$ .............................. F16K 15/02
[52] U.S. Cl. ................................... 137/543.17
[58] Field of Search ............................ 137/540, 543.17

[56] References Cited

U.S. PATENT DOCUMENTS

| | | | |
|---|---|---|---|
| 1,334,507 | 3/1920 | Shartle . | |
| 1,800,185 | 4/1931 | Thrust | 137/543.17 |
| 3,036,592 | 5/1962 | Lips | 137/167 |
| 3,179,122 | 4/1965 | Wasdell | 137/193 |
| 3,194,262 | 7/1965 | Hamilton et al. | 137/193 |
| 3,244,195 | 4/1966 | Wanner | 137/543.17 |
| 3,580,277 | 5/1971 | Gettel | 137/525.5 |
| 4,007,758 | 2/1977 | Gray et al. | 137/472 |
| 4,218,407 | 8/1980 | Robertson | 261/64 R |
| 4,637,430 | 1/1987 | Scheffel et al. | 137/516.29 |
| 4,699,173 | 10/1987 | Rohling | 137/614.2 |

FOREIGN PATENT DOCUMENTS 391326 11/1973 U.S.S.R. .
558201 12/1943 United Kingdom .

Primary Examiner—Robert G. Nilson
Attorney, Agent, or Firm—Fay, Sharpe, Beall, Fagan, Minnich & McKee

[57] ABSTRACT

A check valve responsive to low cracking pressures includes first and second body portions defining a valve chamber. An inlet and outlet passage communicate with the valve chamber while a valve element received therein moves between open and closed positions responsive to pressure differentials. A stop member welded to the valve body is adapted to limit the opening movement of the valve element. An axially raised central portion of the stop member abuttingly engages the valve element to limit its opening movement yet permit fluid flow around the valve element to plural openings defined in a peripheral region of the stop member. A guide member is interposed between the stop member and valve element to urge a seal member disposed on one face of the valve element toward a seated, closed position.

20 Claims, 3 Drawing Sheets

FIG. 4

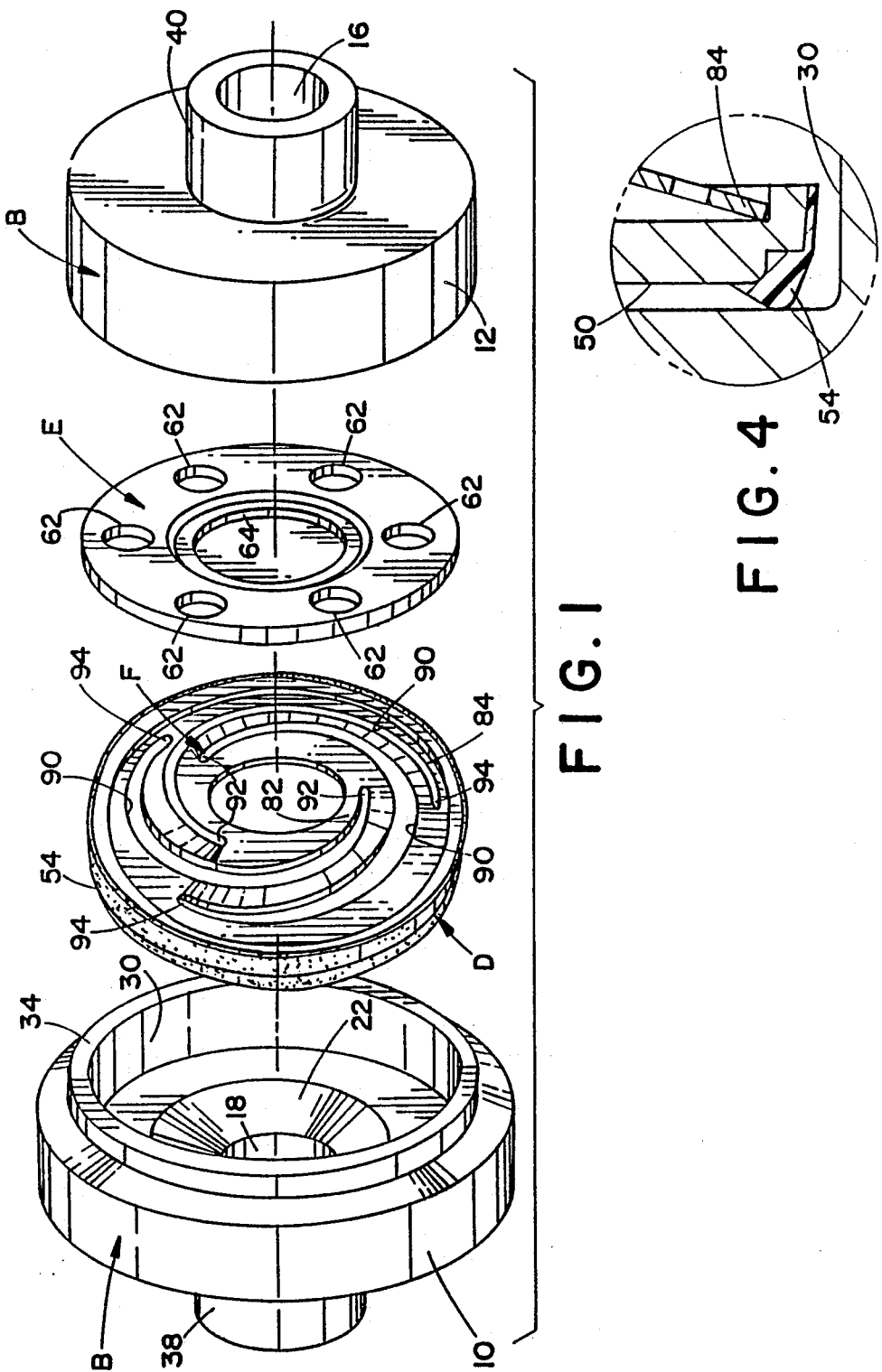

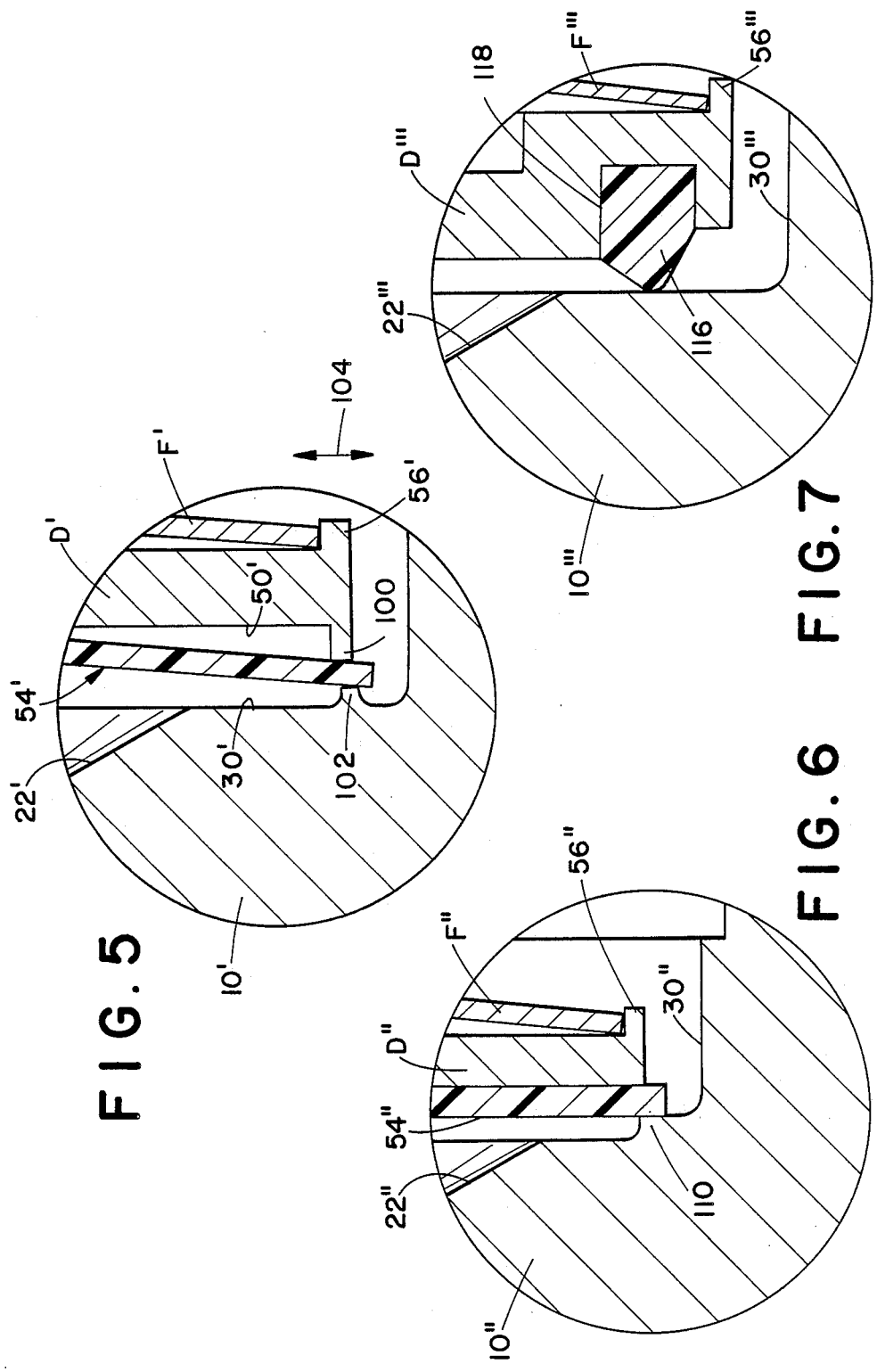

CHECK VALVE

This application is a continuation-in-part of Ser. No. 239,557, filed Sept. 1, 1988, now U.S. Pat. No. 4,856,555.

BACKGROUND OF THE INVENTION

The subject invention pertains to the valve art and more particularly to an improved check valve.

The invention is particularly applicable to a valve that is extremely sensitive to low cracking pressures and will be described with particular reference thereto; however, the invention could be incorporated in other environments and operable under a variety of pressure conditions.

Prior check valve arrangements are not deemed to be sufficiently sensitive to small differential pressures, i.e., cracking pressures, for regulating fluid flow. Specifically, known valve element and biasing arrangements are believed to be insensitive to slight pressure variations on the order of $\frac{1}{3}$ (one-third) to 2 (two) psi. Use of helical helical springs to bias a valve element toward a closed position is well known in the art. Unfortunately, helical springs can potentially contaminate the fluid system. Additionally, the biasing force of a helical spring tends to cock the valve element and impose eccentric loads that effect performance of the valve.

Although disc-type springs have been considered in other environments, these springs were not believed to be particularly useful in many situations since the valve structure must be altered to accommodate fluid flow past the disc spring. For example, enlarged, spaced openings were formed in the disc spring to define flow passages therethrough. This, in turn, altered the biasing force and sensitivity of the valve arrangement to low cracking pressures. Alternatively, an imperforate annular disc spring was utilized in which can outer diameter portion was secured to the valve body and an inner diameter portion to the valve element. Since the disc spring was imperforate, it was necessary to define a separate flow passage through the valve element. This was not considered particularly desirable since the valve element was, by necessity, of reduced size and, therefore, the surface areas on which the fluid pressure acted were correspondingly reduced. If the valve element was increased in size, the overall valve body and spring also necessitated a change in dimension.

SUMMARY OF THE INVENTION

The present invention contemplates a new and improved check valve which overcomes all the above referred to problems and others and provides an arrangement that is particularly sensitive to low cracking pressures in a simplified, economical arrangement.

According to the invention, the check valve includes a body having an internal valve chamber or cavity communicating with inlet and outlet passages. A valve element is received in the chamber for selective axial movement between open and closed positions. A stop member limits the opening movement of the valve element and includes plural passages permitting fluid flow therethrough. An annular guide member is interposed between the stop member and valve element. The guide member urges the valve element to a closed position and provides a reliable, highly sensitive check valve arrangement.

According to a more limited aspect of the invention, the stop member includes an axially raised central portion defining a stop surface for selectively engaging the valve element and limiting opening movement.

According to yet another aspect of the invention, an axially extending rim is defined on a peripheral portion of the valve element for securing the guide member thereto. The axial dimension of the rim is less than the axial extent of the stop member raised portion so as to define a flow passage therebetween when the valve element engages the stop member.

According to a still further aspect of the invention, the body includes first and second body portions welded together along an interface region and a stop member is welded to the body portions.

A principal advantage of the invention is the sensitivity of a check valve to low cracking pressures.

Yet another advantage of the invention resides in the limited stroke of the valve element between open and closed positions.

Still another advantage of the invention is found in a biasing disc that provides a stable, linear biasing force on the valve element to promote precise seating of the valve element.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 1 is a pictorial, exploded view of the subject new check valve;

FIG. 4 is an enlarged view of the encircled area of FIG. 2 particularly illustrating interconnection of a seal member with the valve element;

FIG. 5 is an enlarged view similar to FIG. 4 of a first alternate seal member construction and manner of securing same to the valve element;

FIG. 6 is an enlarged view similar to FIG. 4 of a second alternate seal member construction and manner of securing same to the valve element; and FIG. 7 is an enlarged view similar to FIG. 4 of a third alternate seal member construction and manner of securing same to the valve element.

DETAILED DESCRIPTION OF THE PREFERRED AND ALTERNATE EMBODIMENTS

Figure 3:
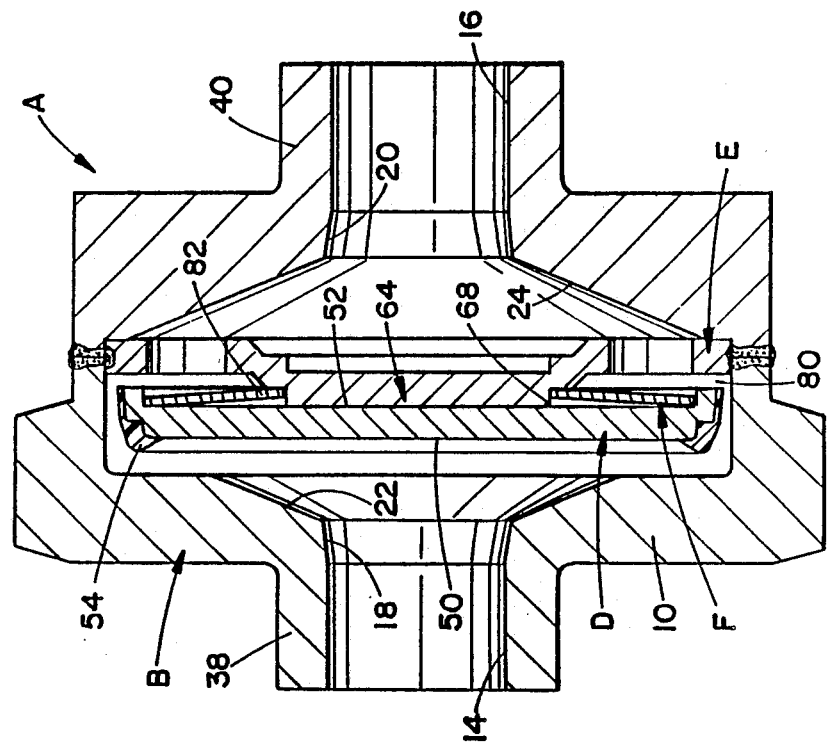
FIG. 3 illustrates a completely assembled check valve in a valve open position.

Referring now to the drawings wherein the showings are for purposes of illustrating the preferred and alternate embodiments of the invention only and not for purposes of limiting same, the FIGURES show a check valve A having a valve body B defining an enclosed cavity or chamber C. Received within the chamber C are three major components comprising a valve element D, stop member E and guide member F.

Figure 2:
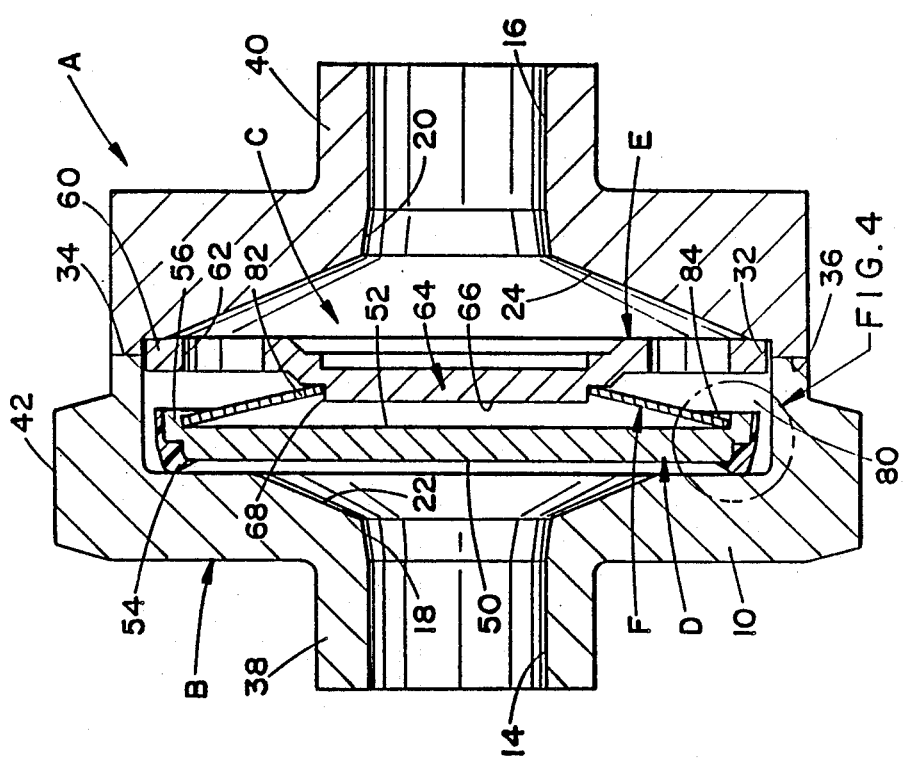
FIG. 2 is a longitudinal cross-sectional view of the valve prior to welding together first and second body protions with a stop member, and representing a valve element in a closed position.

More particularly, and with reference to FIGS. 1-3, the valve body A includes first and second body portions 10, 12, also referred to as the inlet and outlet body portions, respectively. Accordingly, the first or inlet body portion includes an inlet passage 14 and the second or outlet body portion includes an outlet passage 16. The inlet and outlet passages are preferably defined by axially extending bores that have respective tapered counterbores 18, 20 that increase in diameter as they extend from the bores and merge into more widely diverging, tapering regions 22, 24. Each body portion includes a generally constant diameter recess 30, 32 that together define the chamber C when the body portions are brought into mating engagement. Specifically, end faces 34, 36 of the body portions are welded together as will become more apparent below.

The inlet and outlet passages 14, 16 are defined in reduced diameter, generally cylindrical portions 38, 40. These cylindrical portions may be connected to tubular members or fluid passages of a fluid system in any well known manner. For example, the cylindrical portions may be externally threaded to receive a nut and ferrule arrangement or internally threaded to receive threaded pipe ends. Yet another conventional means of connecting is to weld an end face of the cylindrical portion to a tubular member of a fluid system. If will be understood that any of these connecting arrangements can be used with equal success and without departing from the scope and intent of the subject invention. In some arrangements, it may be desirable to provide tool or wrench flats 42 on one of the body portions to facilitate make up and interconnection of the check valve into an associated fluid system.

A valve element D received in the valve chamber C, is defined by an enlarged diameter substantially circular, disc-like member having opposed first and second faces 50, 52. The first face 50 is disposed upstream in facing relation with the inlet passage 14. Likewise, the second face 52 is disposed downstream in generally facing relation with the outlet passage 16. An annular, elastomeric seal member 54 is secured to the valve element. Preferably the seal member is bonded to the first face of the valve element substantially as described in commonly assigned U.S. Pat. No. 4,637,430 of Scheffel, et al., issued Jan. 20, 1987. For purposes of brevity, the detailed description of the structural arrangement and operative function of the annular elastomeric seal ring in the noted patent is incorporated herein by reference. As illustrated, the seal member is bonded to the first face 50 and according to a preferred arrangement is also bonded to the periphery of the valve element, i.e., along an axial surface thereof. In other arrangements, it is contemplated that the seal member will be bonded only on the first face in a manner more akin to that of the patent noted above.

The seal member is received along a radially outer region of the first face (FIG. 4) and adapted to selectively engage a radially extending face of recess 30 of the first body portion. This radially extending face defines a valve seat. In this manner, and as particularly illustrated in FIG. 2, the seal member engages the valve seat along an annular area at a substantially greater diameter than that of inlet passage 14. As shown, the valve seat area has a greater diameter than the maximum dimension of tapering region 22. This dimensional relationship presents an enlarged surface area of the disc on which inlet fluid pressure may act to increase sensitivity of the check valve at low cracking pressures.

The second face of the valve element includes a rim 56 defined along the outer periphery of the element. The rim is preferably circumferentially continuous and extends generally axially outward from the second face toward the outlet passage 16. The rim is adapted to orient and maintain engagement with the guide member F. The guide member may also be tack welded to the second face of the valve element adjacent the rim.

The stop member E is defined by a generally flat, disc-shaped member and has an outer peripheral portion 60 closely received in recesses 30, 32 of the body portions. Particularly, the outer peripheral portion 60 has an axial dimension sufficient to provide engagement with both of the recesses 30, 32 for reasons which will become more apparent below. Plural, spaced openings 62 are disposed adjacent the outer periphery to define passage means that provide a continuous flow path for fluid through the stop member during a valve open condition. A central region 64 of the stop member includes an axially raised portion 66 that defines a step or ledge 68 for receiving a radially inner portion of the guide member. Specifically, the raised portion 66 extends axially toward the inlet passage 14 a substantial dimension beyond the remainder of the upstream face of the stop member and defines a stop surface adapted to selectively engage the second face 52 of the valve element. This abutting engagement defines the axial limit of the opening movement of the valve element resulting from a predetermined pressure differential. That is, if pressure in the inlet passage is greater than that of the outlet passage 16 and the slight biasing force imposed by the guide member, the force exerted on the valve element first face will urge the valve element toward engagement with the stop surface.

In the valve open position illustrated in FIG. 3, it is particularly apparent that the axial extent of the rim 56 is less than the dimension of the raised portion 66 extending axially outward from the remainder of the stop member. This relationship assures that even through abutting engagement occurs between the second face of the valve element and the central portion 66 of the stop member, a fluid passage 80 is still defined around the valve element, radially inward to openings 62, and axially therethrough to the outlet passage 16.

The guide member F is defined by an annular, wafer or disc that urges the valve element to a closed position as illustrated in FIG. 2. An inner radial or central portion 82 of the guide member is closely received on the step 68 of the stop member and may, if desired, be tack welded thereto to define a secure engagement. As referenced above, an outer peripheral portion 84 is radially contained by rim 56 of the valve element and may also be suitably tack welded to the valve element to ensure secure engagement therewith. It will be understood that for selected applications the mere physical engagement of the guide member with rim 56 on the outer periphery and with step 68 on the inner periphery provides a suitable connection so that tack welding may not be necessary at these regions.

The guide member includes first, second, and third slots 90 (FIG. 1) that each extend in a continuous increasing spiral. A radially innermost end 92 of each slot is disposed adjacent the central portion 82 of the guide member and a radially outermost end 94 of each slot is defined adjacent the circumferentially continuous peripheral portion 84. The slots are angularly spaced approximately 120° apart to provide a balanced biasing on the valve element.

A comparison of FIGS. 2 and 3 illustrates that the valve element undergoes an extermely limited stroke between its open and closed positions. For example, the stroke is in the range of 0.0315 inches between its open and closed position. Due to the structural configuration of the annular guide member, an equally distributed biasing force is imposed on the valve element to assure linear movement of the valve element between its open and closed positions. This, in turn, provides for proper seating of the seal member 54 with the valve seat. The guide member maintains the valve element in a centered position and exterts a slight, controlled biasing force on the valve element responsive to low cracking pressures approximating ⅓ (one-third) to 2 (two) psi. With minimal variations between inlet and outlet pressure, thhe force exerted by the guide member is overcome and the valve element moves to an open position. Increasing the inlet pressure will cause the valve element to stroke to a full open position in which the second face 52 abuttingly engages the raised central portion 66 of the stop member.

According to a preferred manner of construction, the valve element, stop member, and guide member are disposed within recess 30 of the first body portion. The second body portion is then aligned therewith, specifically recess 32 aligned with recess 30 of the first body portion. The biasing force of the gide member holds the stop member against the second body portion until the valve body is circumferentially welded. Preferably, an electron beam weld is used since conventional welding techniques may produce excessive heat levels and adversely affect the elastomeric material of the seal member. Since the stop member is received axially in both recesses 30, 33 at an interface region defined by the abutting end faces 34, 36 of the body portions, the electron beam weld that secures the body portions together also penetrates radially inward to secure the stop member in place (FIG. 3). This assures an integral or unitary structure in which the valve element defines a floating component urged to a closed position by the guide member.

FIGS. 5-7 illustrate three alternate embodiments of the seal member 54. For purposes of brevity and ease of understanding, like parts will be identified by like numerals with primed suffixes (', ", "') while new elements will be identified by new numerals. Further, unless specifically noted otherwise, the structure and operation of the remainder of the check valve is substantially the same.

According to the first alternate embodiment of FIG. 5, the seal member 54' is defined as an enlarged elastomeric annulus approximately the same diameter as the guide member F'. It will be understood that means for securing the seal member to the first face 50' of the valve element must be provided. For example, the valve element can be modified in substantially the same manner as the stop member, i.e., through inclusion of a centrally raised portion, to which an inner diameter portion of the seal member can be secured. Of course still other securing arrangements can be utilized, as well as other structural configurations for the seal member, without departing from the scope and content of the subject invention.

The valve element D' is suitably modified through formation of a circumferentially continuous raised bead 100 along the outer peripheral portion thereof. The bead cooperates with a similar bead 102 extending axially outward from the recess 30'. Thus, the bead 102 defines a circumferentially continuous valve seat for regulating fluid flow therethrough. Due to its elastomeric nature, the seal member is adapted to flex along an area spaced radially inward from the beads 90, 102. Further, the beads may be radially aligned or, for selected other applications, the beads may be radially offset as represented by arrow 104.

Referring now to FIG. 6, the second alternate embodiment will be described in greater detail. Again, the seal member 54' is an elastomeric annulus that is preferably secured to the valve element D" along a central portion. The first face 50" is substantially planar so that the seal member lies flat against it. The raised bead extending from the valve body in the FIG. 5 arrangement is replaced by raised shelf 100. The raised shelf gradually merges into the recess 30" at an area disposed radially outward from the valve seat.

Lastly, and as shown in FIG. 7, the third embodiment of seal member 54'" includes a bonded poppet 116. A groove 118 closely receives the poppet therein. In a manner substantially the same as described above with respect to the FIG. 1 embodiment, the seal member is bonded to the valve element D'". The poppet again utilizes a V-shaped cross-sectional configuration to define a limited area of contact with the recess 30'".

The invention has been described with reference to the preferred embodiment. Obviously modifications and alterations will occur to others upon a reading and understanding of this specification. It is intended to include all such modifications and alterations insofar as they come within the scope of the appended claims or the equivlents thereof.

Having thus described the invention, it is now claimed:

1. A check valve comprising:
   first and second body portions which define a valve chamber;
   an inlet and an outlet communicating with said valve chamber;
   a valve element received in said valve chamber for selective movement in response to pressure differentials;
   a stop member received in said valve chamber for limiting opening movement of said valve element; and
   a guide member interposed between said valve element and stop member for urging said valve element toward a closed portion, a radially inner portion of said guide member operatively associated with a radially inner portion of said stop member and a radially outer portion of said guide member operatively associated with a radially outer portion of said valve element.

2. The check valve as defined in claim 1 wherein said stop member is received in said valve chamber at an interface region of said first and second body portions, said stop member being integrally welded to said body portions.

3. The check valve as defined in claim 1 wherein said valve element has a first face receiving an elastomeric sealing member thereon and adapted to selectively sealingly engage around said inlet.

4. The check valve as defined in claim 3 wherein said guide member is secured to a second face of said valve element oppositely disposed from said first face.

5. The check valve as defined in claim 3 wherein said elastomeric sealing member is received between first and second beads defined on the valve element first face and one of the body portions, respectively.

6. The check valve as defined in claim 5 wherein said beads are radially aligned.

7. The check valve as defined in claim 3 wherein said elastomeric sealing member is secured in a groove defined in said first face of the valve element.

8. The check valve as defined in claim 3 wherein the elastomeric sealing member is approximately the same size as the guide member.

9. The check valve as defined in claim 8 further comprising a valve seat defined by a raised member extending axially outward from the first body portion.

10. The check valve as defined in claim 1 wherein the stop member has an axially raised central portion for limilting movement of said valve element.

11. The check valve as defined in claim 1 wherein said stop member has passage means extending axially therethrough adapted to permit fluid flow from said inlet to said outlet.

12. The check valve as defined in claim 11 wherein said stop member has a stepped configuration defined by an axially raised central portion receiving said radially inner portion of said guide member thereover and a peripheral region having said passage means therein.

13. The check valve as defined in claim 12 wherein said valve element has a rim disposed adjacent the periphery thereof for receiving the radially outer portion of said guide member, said rim extending axially toward said stop member a predetermined dimension less than the axial extent of said top member central portion to define a flow passage therebetween when said stop member limits movement of said valve element.

14. A check valve comprising:
   a body having an internal chamber; inlet and outlet passages communicating with said chamber;
   a valve element having opposed first and second faces received in said chamber for selectively opening and closing communication between said inlet and outlet passages in response to a predetermined pressure differential;
   a stop member received in said chamber for limiting movement of said valve element, said stop member including passage means adapted to allow fluid flow therethrough;
   an elastomeric seal member received on a first face of said valve element and adapted to selectively limit communication between said valve chamber and one of said inlet or outlet passages; and
   a biasing guide member for urging said valve element toward a closed position, said guide member having a central portion operatively associated with said stop member and an outer peripheral portion operatively associated said valve element second face.

15. The check valve as defined in claim 14 wherein said stop member includes an axially raised central portion adapted for selective engagement with said valve element.

16. The check valve as defined in claim 15 wherein said valve element second face includes a circumferential rim for securing said guide member thereto, said rim extending axially a dimension less than an axial dimension of said stop member central portion to define a flow passage between said valve element and stop member in a valve open position.

17. The check valve as defined in claim 14 wherein said seal member is bonded to said valve element along a peripheral portion thereof.

18. The check valve as defined in claim 14 wherein the effective surface area of said valve element is substantially larger than the cross-sectional area of said inlet passage whereby said valve element is sensitive to low inlet pressures.

19. The check valve as defined in claim 14 wherein said body includes first and seocnd body portions, one of said body portions having a recessed area for axially and radially capturing said stop member therein.

20. The check valve as defined in claim 19 wherein said first and second body portions interface adjacent said recess and are welded together with said stop member.

* * * * *